United States Patent
Delandro et al.

(10) Patent No.: US 7,032,015 B1
(45) Date of Patent: Apr. 18, 2006

(54) SYSTEM AND METHOD FOR INTEGRATING A POWER SYSTEM OVER A NETWORK

(75) Inventors: Kwame Delandro, New Britain, CT (US); Carol Cummiskey, Cromwill, CT (US); Anthony M. Zupa, Oxford, CT (US)

(73) Assignee: General Electric Company, Schenectady, NY (US)

( * ) Notice: Subject to any disclaimer, the term of this patent is extended or adjusted under 35 U.S.C. 154(b) by 530 days.

(21) Appl. No.: 09/699,400

(22) Filed: Oct. 31, 2000

(51) Int. Cl.
*G06F 15/177* (2006.01)
*G06F 15/16* (2006.01)
*G06F 9/445* (2006.01)
*G06F 11/00* (2006.01)

(52) U.S. Cl. .................. 709/222; 709/223; 709/203; 714/36; 717/177

(58) Field of Classification Search ............. 709/220, 709/223, 224, 203, 200, 221; 714/36, 44, 714/45, 47, 48; 713/2; 717/100, 101, 176, 717/177, 178
See application file for complete search history.

(56) References Cited

U.S. PATENT DOCUMENTS

| | | | |
|---|---|---|---|
| 4,799,254 A | 1/1989 | Dayton et al. | |
| 4,833,592 A | 5/1989 | Yamanaka | |
| 5,124,908 A | 6/1992 | Broadbent | |
| 5,155,847 A * | 10/1992 | Kirouac et al. ............. | 709/221 |
| 5,218,605 A * | 6/1993 | Low et al. .................... | 714/45 |
| 5,349,643 A * | 9/1994 | Cox et al. .................... | 713/155 |
| 5,406,495 A | 4/1995 | Hill | |
| 5,570,291 A | 10/1996 | Dudle et al. | |
| 5,630,125 A | 5/1997 | Zellweger | |
| 5,684,718 A | 11/1997 | Jenkins et al. | |
| 5,712,896 A | 1/1998 | Lee et al. | |
| 5,717,930 A * | 2/1998 | Imai et al. .................. | 717/176 |
| 5,719,558 A | 2/1998 | Namba | |
| 5,742,829 A * | 4/1998 | Davis et al. ................ | 717/178 |
| 5,758,328 A | 5/1998 | Giovannoli | |
| 5,768,148 A * | 6/1998 | Murphy et al. ............ | 700/286 |
| 5,790,424 A | 8/1998 | Sugihara et al. | |
| 5,844,554 A | 12/1998 | Geller et al. | |
| 5,859,969 A * | 1/1999 | Oki et al. ................... | 709/200 |
| 5,862,391 A | 1/1999 | Salas et al. | |
| 5,867,713 A * | 2/1999 | Shrader et al. ............. | 717/176 |

(Continued)

FOREIGN PATENT DOCUMENTS

EP        0853368 A2      7/1998

(Continued)

OTHER PUBLICATIONS

U.S. Appl. No. 09/593,959, filed Jun. 15, 2000, and the art cited therin (cited on p. 6 of the present application).

*Primary Examiner*—Saleh Najjar
*Assistant Examiner*—Kevin T Bates
(74) *Attorney, Agent, or Firm*—Hunton & Williams

(57) ABSTRACT

A method and system of integrating a software application over a network include receiving an order for a software system from a user at a server over the network. The process further includes configuring the user's system over the network, and installing the software system over the network. A start up operation may also be performed over the network. The software package delivered according to the invention may in one implementation be a Power Management Control System (PMCS) such as those developed by the General Electric Co.

11 Claims, 8 Drawing Sheets

U.S. PATENT DOCUMENTS

| | | | |
|---|---|---|---|
| 5,870,610 A * | 2/1999 | Beyda | 717/173 |
| 5,897,635 A * | 4/1999 | Torres et al. | 707/10 |
| 5,950,010 A * | 9/1999 | Hesse et al. | 717/178 |
| 6,005,759 A | 12/1999 | Hart et al. | |
| 6,006,171 A | 12/1999 | Vines et al. | |
| 6,040,834 A | 3/2000 | Jain et al. | |
| 6,067,525 A | 5/2000 | Johnson et al. | |
| 6,167,383 A | 12/2000 | Henson | |
| 6,182,275 B1 * | 1/2001 | Beelitz et al. | 717/175 |
| 6,202,070 B1 * | 3/2001 | Nguyen et al. | 707/104.1 |
| 6,236,332 B1 | 5/2001 | Conkright et al. | |
| 6,243,745 B1 * | 6/2001 | Casey et al. | 709/220 |
| 6,260,160 B1 * | 7/2001 | Beyda et al. | 714/27 |
| 6,272,537 B1 * | 8/2001 | Kekic et al. | 709/223 |
| 6,297,742 B1 | 10/2001 | Canada et al. | |
| 6,317,722 B1 | 11/2001 | Jacobi et al. | |
| 6,324,578 B1 * | 11/2001 | Cox et al. | 709/223 |
| 6,449,739 B1 | 9/2002 | Landan | |
| 6,476,828 B1 * | 11/2002 | Burkett et al. | 715/760 |
| 6,519,509 B1 * | 2/2003 | Nierlich et al. | 700/286 |
| 6,522,987 B1 * | 2/2003 | Flink et al. | 702/122 |
| 6,553,563 B1 * | 4/2003 | Ambrose et al. | 717/116 |
| 6,578,142 B1 * | 6/2003 | Anderson et al. | 713/2 |
| 6,618,630 B1 | 9/2003 | Jundt et al. | |
| 6,643,555 B1 * | 11/2003 | Eller et al. | 700/83 |
| 6,697,824 B1 | 2/2004 | Bowman-Amuah | |
| 2002/0054096 A1 | 5/2002 | Thomas | |
| 2002/0057365 A1 | 5/2002 | Brown | |
| 2003/0041098 A1 | 2/2003 | Lortz | |
| 2003/0061335 A1 | 3/2003 | Thomas et al. | |
| 2004/0054717 A1 | 3/2004 | Aubry et al. | |

FOREIGN PATENT DOCUMENTS

WO     WO 00/04427     1/2000

* cited by examiner

SYSTEM AND METHOD FOR INTEGRATING A POWER SYSTEM OVER A NETWORK

FIELD OF THE INVENTION

This invention relates generally to software integration, and more particularly, to network-based software integration.

BACKGROUND OF THE INVENTION

Power management control systems (PMCSs), such as those developed and sold by the General Electric Co., monitor and control a variety of intelligent electronic devices connected to an electrical distribution system, such as power meters, circuit breakers and others. A PMCS includes a computer connected to a common bus that allows the intelligent monitoring or control devices to communicate with a server. The PMCS provides graphical representations of and links to the devices of the distribution system to enable a user to monitor and operate the distribution system.

After a customer orders a PMCS, an integrator assembles the relevant customer information, builds the application, prepares the customer PC and loads the relevant software. The integrator is also present at startup to configure the devices and the network, and to make sure the application works according to specification.

Currently, the integration of a power management control system is largely done manually, which requires a large amount of attention, expense and time. When the integrator or other technical representative is not present at the customer site, information may have to be exchanged via facsimile or telephone, which slows down the integration process. A large amount of process time results in backlogs in integration jobs, high costs of integration, and large cycle times.

SUMMARY OF THE INVENTION

The invention overcoming these and other problems in the art relates to a system and method of integrating a software application over a network. The invention may include a step of receiving an order for a software system from a user at a server over the network. The invention may further include installing the software system on a user system over the network, testing that software system via the network for robustness, and starting up operation of the software system over the network.

These and other objects, features and advantages of the invention will be apparent through the detailed description of the preferred embodiments and the drawings attached hereto. It is also to be understood that both the foregoing general description and the following detailed description are exemplary and explanatory and not restrictive of the scope of the invention.

BRIEF DESCRIPTION OF THE DRAWINGS

The invention will be described with respect to the accompanying drawings, in which like elements are referenced with like numbers.

DETAILED DESCRIPTION OF PREFERRED EMBODIMENTS

Figure 1:
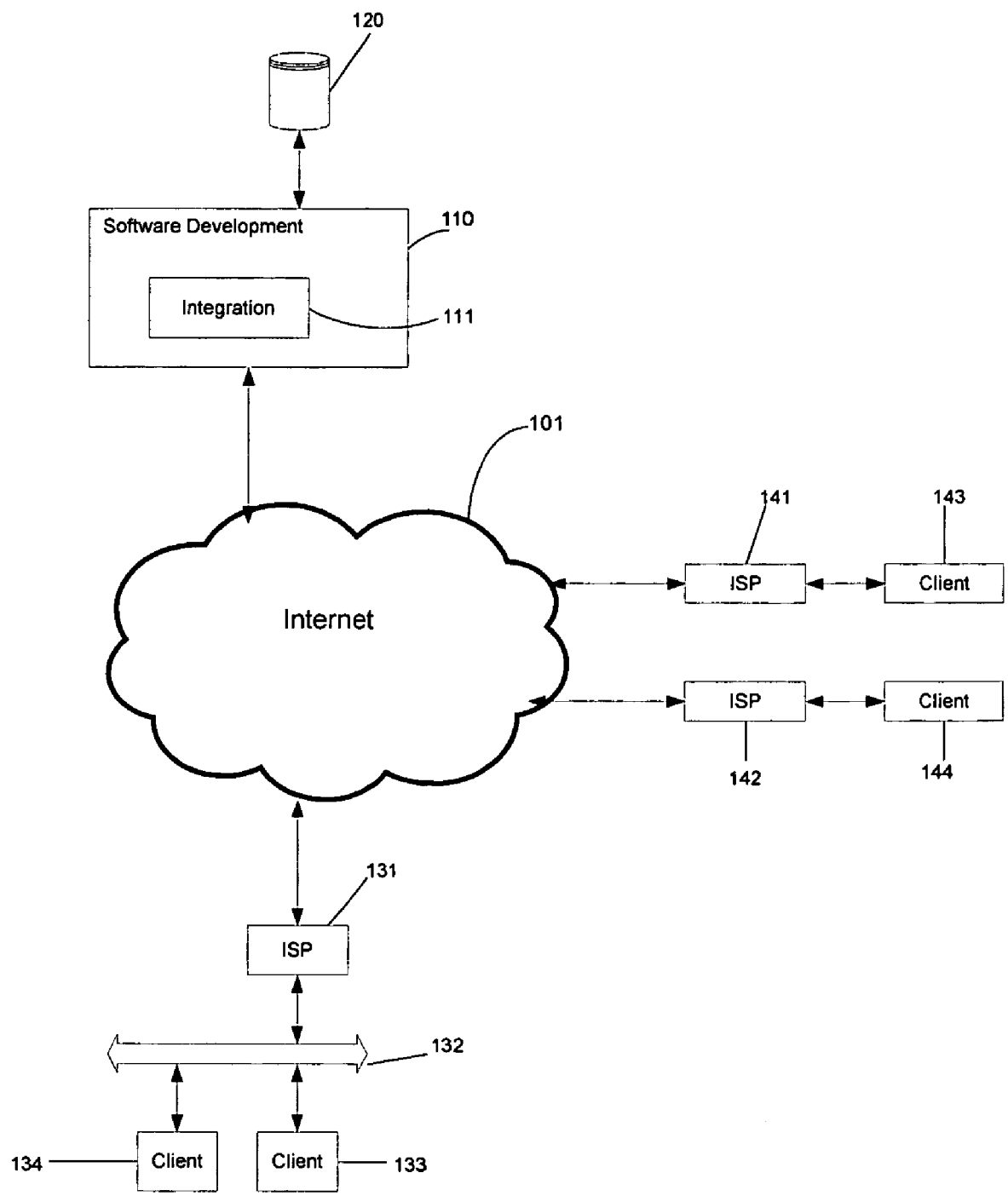
FIG. 1 is a block diagram illustrating one embodiment of a system for software integration.

In terms of the general environment and resources in or with which the invention may operate, a computer system may include a bus, or other communication mechanism for communicating information, and a processor coupled to a bus for processing information. The computer system also includes main memory such as random access memory (RAM) or other dynamic storage device, coupled to the bus for storing information and instructions to be executed by the processor. Main memory also may be used for storing temporary variables or other intermediate information during execution of instructions to be executed by the processor. The computer system further includes read only memory (ROM) or other static storage device coupled to the bus for storing static information and instructions for the processor. A storage device such as a magnetic disk or optical disk may be provided and coupled to the bus for storing information and instructions.

The computer system may be coupled via a bus to a display, such as a cathode ray tube (CRT), liquid crystal display (LCD) or other device, for displaying information to a computer user. An input device, including alphanumeric and other keys, is coupled to the bus for communicating information and command selections to the processor. Another type of input device is cursor control, such as a mouse, a trackball, or cursor direction keys for communicating directional information and command selections to the processor and for controlling cursor movement on the display. This input device typically has two degrees of freedom in two axes, a first axis (e.g., x) and a second axis (e.g., y), that allows the device to specify positions in a plane.

The invention is related in one regard to the use of the computer system for integrating a power management control system (PMCS), using computer, network and other resources. According to one embodiment of the invention, the integration of the PMCS is provided via the computer system in response to the processor executing one or more sequences of one or more instructions contained in main memory.

Such instructions may be read into main memory from another computer-readable medium, such as the storage device. Execution of the sequences of instructions contained in main memory causes the processor to perform the process steps described herein. One or more processors in a multi-processing arrangement may also be employed to execute the sequences of instructions contained in main memory. In alternative embodiments, hard wired circuitry may be used in place of or in combination with software instructions to implement the invention. Thus, embodiments of the invention are not limited to specific combination of hardware circuitry and software.

The term "computer-readable medium" as used herein refers to any medium that participates in providing instructions to the processor for execution. Such a medium may take many forms, including but not limited to non-volatile media, volatile media, and transmission media. Non-volatile media include dynamic memory, such as main memory. Transmission media include coaxial cables, copper wire and fiber optics, including the wires that comprise the bus. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor for execution. For example, the instructions may initially be borne on a magnetic disk of a remote computer. The remote computer can load the instructions into its dynamic memory and send the instructions over a telephone line using a modem. A modem local to the computer system can receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by main memory may optionally be stored on a storage device as described herein, either before or after execution by the processor.

The computer system also includes a communication interface coupled to the bus. The communication interface provides a two-way data communication coupling to a network link that is connected to a local or other network. For example, the communication interface may be an integrated service digital network (ISDN) card or a modem to provide a data communication connection to a corresponding type of telephone line. As another example, the communication interface may be a local area network (LAN) card to provide a data communication connection to a compatible LAN. Wireless links also may be implemented. In any such implementation the, communication interface sends and receives electrical, electromagnetic or optical signals that carry digital data streams representing various types of information.

The network link typically provides data communication through one or more networks to other data devices. For example, the network link may provide a connection through local network to a host computer, server or to other data equipment operated by an Internet Service Provider (ISP) or other entity. The ISP in turn provides data communication services through the world wide packet data communication network, now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

The computer system can send messages and receive data, including program code, through the network(s), network link, and the communication interface. In the Internet example, a server might transmit a requested code for an application program through the Internet, ISP, local network and communication interface. In accordance with the invention, one such downloaded application provides for operating and maintaining the integration system described herein. The received code may be executed by the processor as it is received, and/or stored in storage device, or other non-volatile storage for later execution. In this manner, the computer system may obtain application code via a carrier wave or other communications.

Generally, and in accordance with an embodiment of the invention, links to power management control system (PMCS) devices and PMCS software are accessible from a network (e.g., the Internet) by a user for the purpose of ordering and integrating a PMCS. Those intelligent electronic or other devices may include, for instance, a power regulator, a waveform analyzer, a meter, a transformer, a relay, a starter, an input/output unit, and a circuit breaker and associated electronics and software. A PMCS and related intelligent electronic devices are described in commonly assigned U.S. Pat. No. 5,862,391, which is herein incorporated by reference in its entirety. A method and system for configuring, viewing and ordering a PMCS are described in commonly assigned U.S. patent application Ser. No. 09/593, 959, which is herein incorporated by reference in its entirety.

When a user, purchaser or other interested party, wants to order a PMCS, the user may enter the network at the visitor access home page. In order to access this home or root page, which may be serviced or supported by a server or other platform in the network, the user may use a computer loaded with a network browser (e.g., Web browser such as Internet Explorer manufactured by Microsoft Corp.) and connectivity to the network (e.g., Internet via an Internet Service Provider (ISP)). The server in one regard may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

FIG. 1 is a block diagram illustrating one embodiment of a system for integrating software. The software integration system 100 includes a software development site 110, having an integrator 111 and a database 120, the Internet 101, ISPs 131, 141, 142, and clients or users 133, 134, 143, 144. Clients 133, 134, 143, 144 are connected to the Internet 101 through ISPs 131, 141, 142. Clients 133 and 134 are coupled to ISP 131 through network 132, client 143 is coupled to ISP 141 and client 144 is coupled to ISP 142. The software development site 110 is also connected to the Internet 101.

Although only four clients 133, 134, 143, 144 are shown, in actual practice, there may be fewer or significantly more users connected to the software integration system 100 than shown. This would mean that there would be additional users which are connected through the same ISPs shown or through other ISPs. However, for purposes of illustration, the discussion will assume four clients 133, 134, 143, 144 connected to Internet 101 through three ISPs 131, 141, 142.

Although any network may be used for the system, for the purpose illustration, the clients 133, 134, 143, 144 and software development site 110 are shown to be connected to Internet 101. Client systems 133, 134, 143, 144 may have resident thereon at least one user interface (UI) application module. In one embodiment, the UI application module may include an Internet browser, such as Netscape Navigator™ or Microsoft Internet Explorer™. Client systems 133, 134, 143, 144 may further comprise a communication application module, such as an email application such as Microsoft Beyond Mail™, Netscape Mail™, Eudora PrO™ or the like.

Clients 133, 134, 143, 144 may represent customers or users of the software development site 110. Clients 133, 134, 143, 144 may access the software development site 110 through ISPs 131, 141, 142, which are coupled to Internet 101. Clients 133, 134, 143, 144 may represent users or customers requesting software for a specific application such as, for example, power management control software.

According to one embodiment of the invention, clients 133, 134, 143, 144 may be users with any computing device capable of accessing Internet 101 through ISPs 131, 141, 142. Alternatively, some or all of clients 133, 134, 143, 144 may access Internet 101 through a direct connection. Clients 133, 134, 143, 144 may comprise personal computers having a modem module, a display module, memory module, various input device modules and a central processing module. As may be appropriate, clients 133, 134, 143, 144 may further comprise special purpose devices optimized solely for various applications but with the ability to access the Internet 101.

The clients 133, 134, 143, 144 may be or include, for instance, a personal computer running the Microsoft Windows™ 95, 98, Millenium™, NT™, or 2000, Windows™CE™, PalmOS™, Unix, Linux, Solaris™, OS/2™, BeOS™, MacOS™ or other operating system or platform. Clients 133, 134, 143, 144 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. Clients 133, 134, 143, 144 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art. Clients 133, 134, 143, 144 may also be or include a network-enabled appliance such as a WebTV™ unit, radio-enabled Palm™ Pilot or similar unit, a set-top box, a networkable game-playing console such as Sony Playstation™ or Sega Dreamcast™, a browser-equipped cellular telephone, or other TCP/IP client or other device.

The software development site 110 may maintain a high speed, large bandwidth communications link to Internet 101. The communications link may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. The communications link may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. The communications link may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

In one embodiment, some of the clients 133, 134, 143, 144 may include suppliers in a distribution system, as discussed below. The software development site 110 may function to permit clients 133, 134, 143, 144 to interact with each other through links created by the software development site 110.

Software development site 110 may comprise either a single server computer or multiple server configured to appear to clients 133, 134, 143, 144 as a single resource. The software development site 110 may receive requests from clients 133, 134, 143, 144 through Internet 101 for customized software. The integrator 111 of software development site 110 may receive information from clients 133, 134, 143, 144, direct customization of a software application, prepare the customer computer system, download the relevant software through Internet 101, start up the computer system by configuring the devices in the network, and ensure the software application works according to specification through simulation or other testing.

Database 120 may be located within the software development site 110 or coupled to software development site 110. Database 120 may store various software, interface templates for receiving customer information, screen design templates or any other information that is used in the development and integration of software systems.

Figure 2:
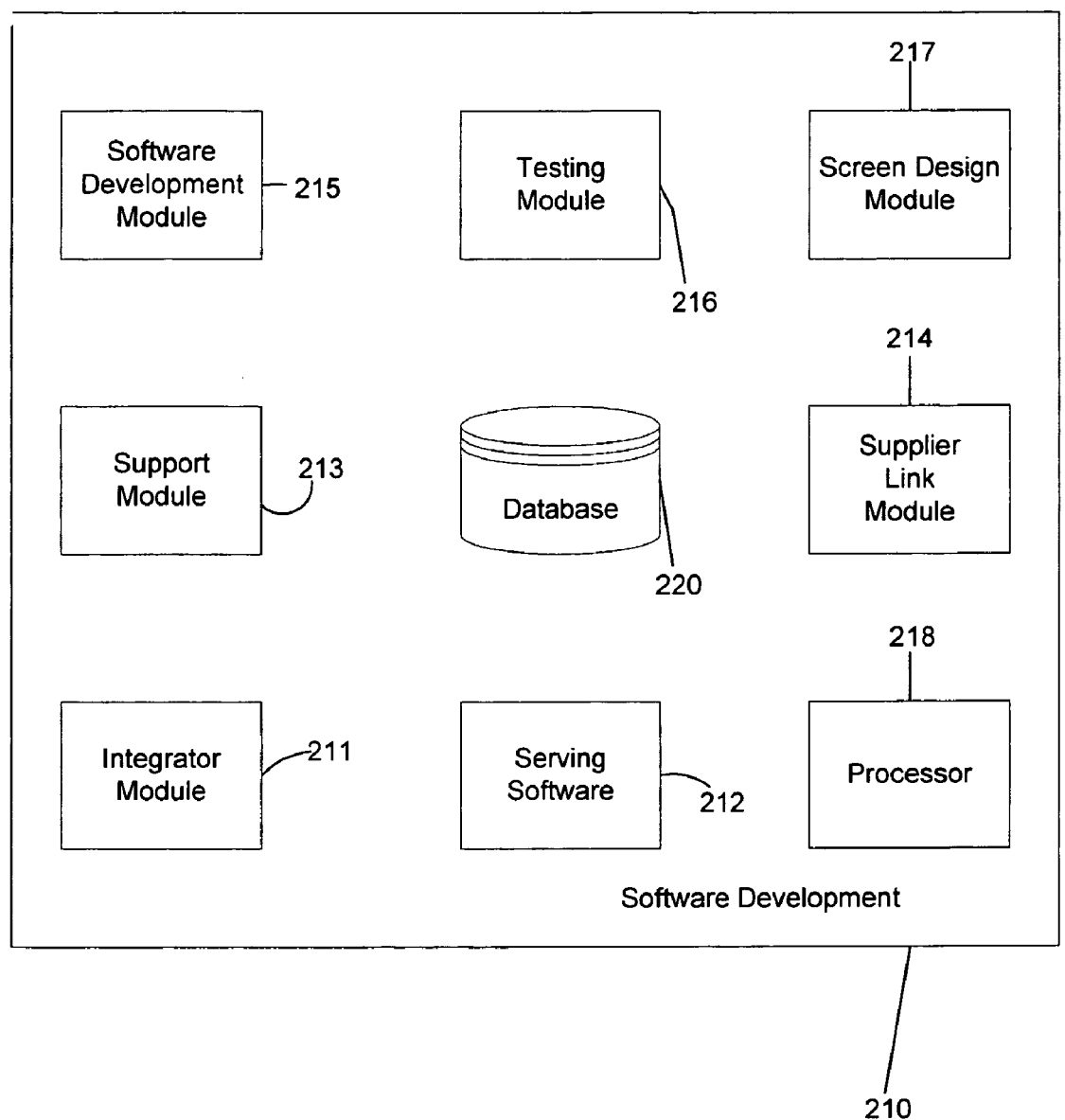
FIG. 2 is a block diagram illustrating one embodiment of a software development site in the system of FIG. 1.

FIG. 2 is a block diagram of one embodiment of a software development site in the system of FIG. 1. Software development site 210 includes an integrator module 211, serving software 212, a support module 213, a supplier link module 214, a software development module 215, a testing module 216, a screen design module 217, a processor module 218 and a database 220. The processes performed at modules 210–217 will be described in greater detail with reference to FIGS. 3–8 below.

The integrator module 211 receives requests for software systems including customer information through a connection through the Internet 101. The integrator 211 directs the requests and customer information to software development module 215 and database 220. The integrator module also integrates the processes performed at software development module 215, screen design module 217 and supplier link module 214, and downloads the customized software to a user computer system 133, 134, 143, 144. The integrator 211 prepares the user computer system 133, 134, 143, 144 to receive the customized software, configures the devices and the network of the user computer system 133, 134, 143, 144 and ensures that the developed software system works according to specification.

Software applications for the software system requested are developed at the software development module 215 based on the customer information provided by users 133, 134, 143, 144 via the Internet 101. The development process may be carried out through transmission of design information to the user over the Internet 101, as described below with reference to FIG. 5.

The software applications developed at software development module 215 may be tested at testing module 216 to ensure that they ready to be installed and they meet the required specifications. The screen design for the software system requested may be customized at screen design module 217, and supplier links may be created at supplier link module 214. Database 220 may store customer information, software, screen design templates, supplier link information, etc.

Serving software module 212 is used to communicate through Internet 101. Support module 213 performs support processes after installation of the software applications through the Internet 101. Processor 218 executes instructions for performing the various functions described with respect to modules 211–217.

Figure 3:
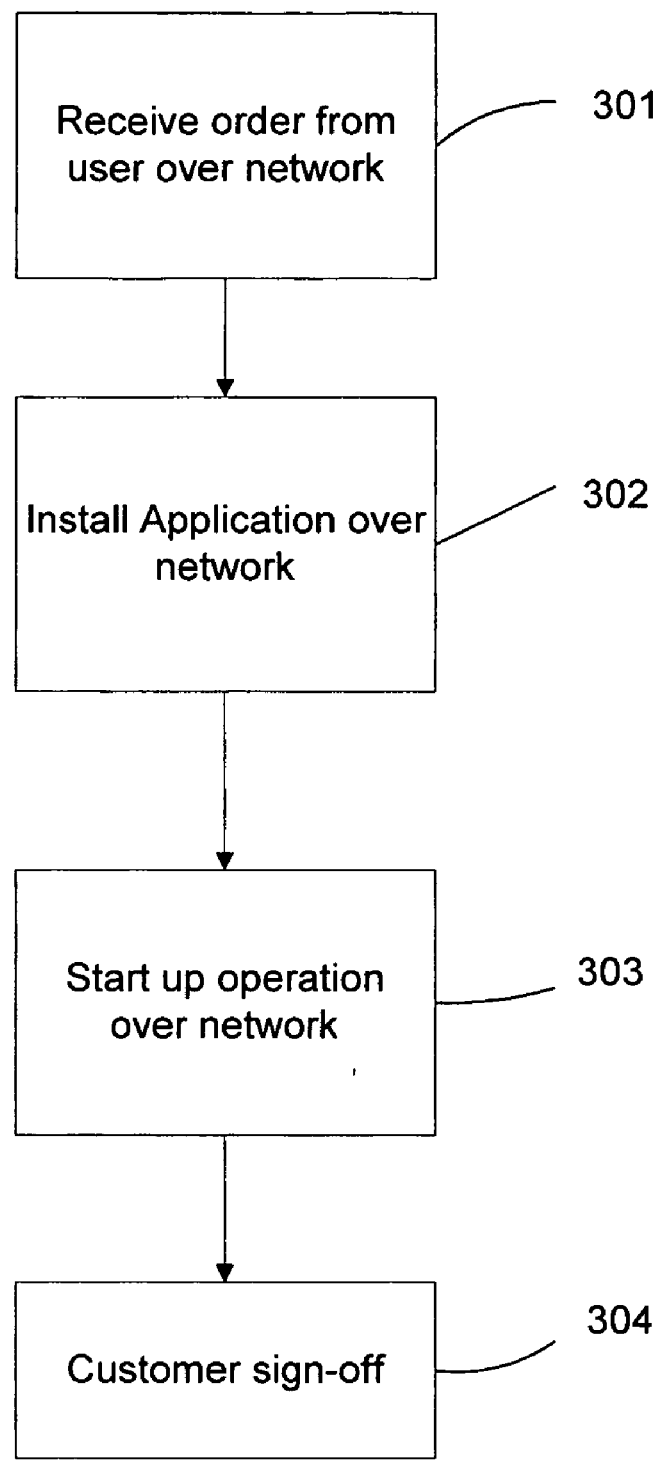
FIG. 3 is a flow diagram illustrating one embodiment of a software integration method.

FIG. 3 is a flow diagram illustrating one embodiment of a software integration method. At processing block 301, an order for software is received from a user 133, 134, 143, 144 over a network 101. At processing block 302, the software application is installed over the network 101. At processing block 303, a start-up operation is performed over the network 101. At processing block 304, the integration process is concluded by customer 133, 134, 143, 144 sign off from the software development site 110.

At processing block 301, the software development system receives an order from a user 133, 134, 143, 144 over a network, such as, for example, the Internet 101. A user 133, 134, 143, 144 may enter information regarding the user, the user's industry, and particular needs in software into an input form provided by the software development site 110. The user may enter this information on a homepage or root page at a website for the software development site 110.

The user or customer information may be received by integrator 211 and directed to the appropriate modules. The software requested by the user will then be installed at processing block 302 via the Internet 101. At processing block 303, the start-up operation will be performed over the Internet 101 to configure devices and the client computer system 133, 134, 143, 144, and to ensure that the application installed works according to specification.

At processing block 304, the integrator 211 receives indication that the customer has signed off, ending the integration process. By signing off from the software development site 110, the client 133, 134, 143, 144 acknowledges that the software has been installed, configured and tested, thus ending the integration process.

Figure 4:
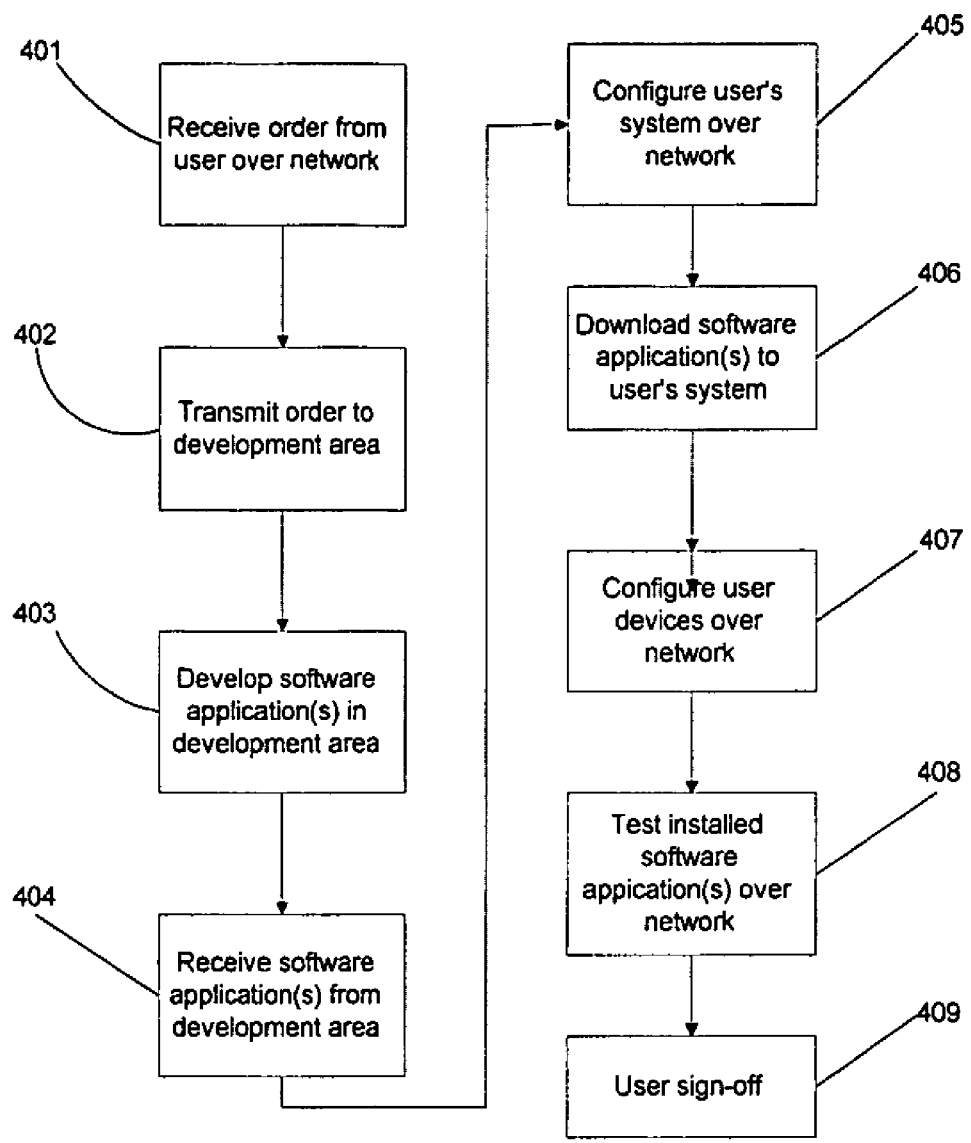
FIG. 4 is a more detailed flow diagram illustrating one embodiment of a software integration method.

FIG. 4 is a more detailed flow diagram illustrating one embodiment of a software integration method. At processing block 401, an order is received from a user over a network for a software system. At processing block 402, the order is transmitted to a development area 215. At processing block 403, one or more software applications are developed in the development area 215. At processing block 404, the software applications developed at the development area 215 are received by the integrator module 211. At processing block 405, the user system is configured over a network. At processing block 406, the software applications developed by the development area 215 are downloaded to the user system 133, 134, 143, 144. At processing block 407, user devices are configured over the network. At processing block 408, the installed software applications may be tested remotely over the network to assure satisfactory performance and reliable behavior. Testing may be performed by running predetermined data through the assembled software applications to determine system integrity and responsiveness, or through other methods. At processing block 409, the user signs off, indicating the end of the integration process.

At processing block 401, the integrator module 211 receives an order from a user 133, 134, 143, 144 over a network such as, for example, the Internet 101. The order received may be for a software system that needs to be customized or developed specifically for the user, or a software system already in existence. At processing block 402, if the software system needs to be configured or developed specifically for the user, the order is transmitted to a development area 215. At processing block 403, the software applications necessary for the software system are developed in the development module 215.

If in the operation of the invention, power management control system (PMCS) software is requested, PMCS applications and human machine interface ("HMI") software applications may be developed at development module 215. The development of the software will be described in more detail below, with reference to FIG. 5.

At processing block 404, software applications developed at development area 215 are received by the integrator module 211. At processing block 405, the integrator module 211 configures the user system 133, 134, 143, 144 over the network. At processing block 406, the software applications developed by development area 215 may be downloaded to the user system 133, 134, 143, 144.

After the applications have been installed, the integrator performs a startup operation at processing blocks 407 and 408. At processing block 407, the integrator 211 may configure the user devices and the user's computer system over the network. At processing block 408, the installed software and configurations may be tested over the network to ensure functionality and conformance to specifications.

At processing block 409, the integrator 211 receives indication that the user has signed off, ending the integration process. As described above with reference to processing block 304, the user 133, 134, 143, 144 sign off acknowledges that the software has been installed, configured and tested, thus ending the integration process.

Figure 5:
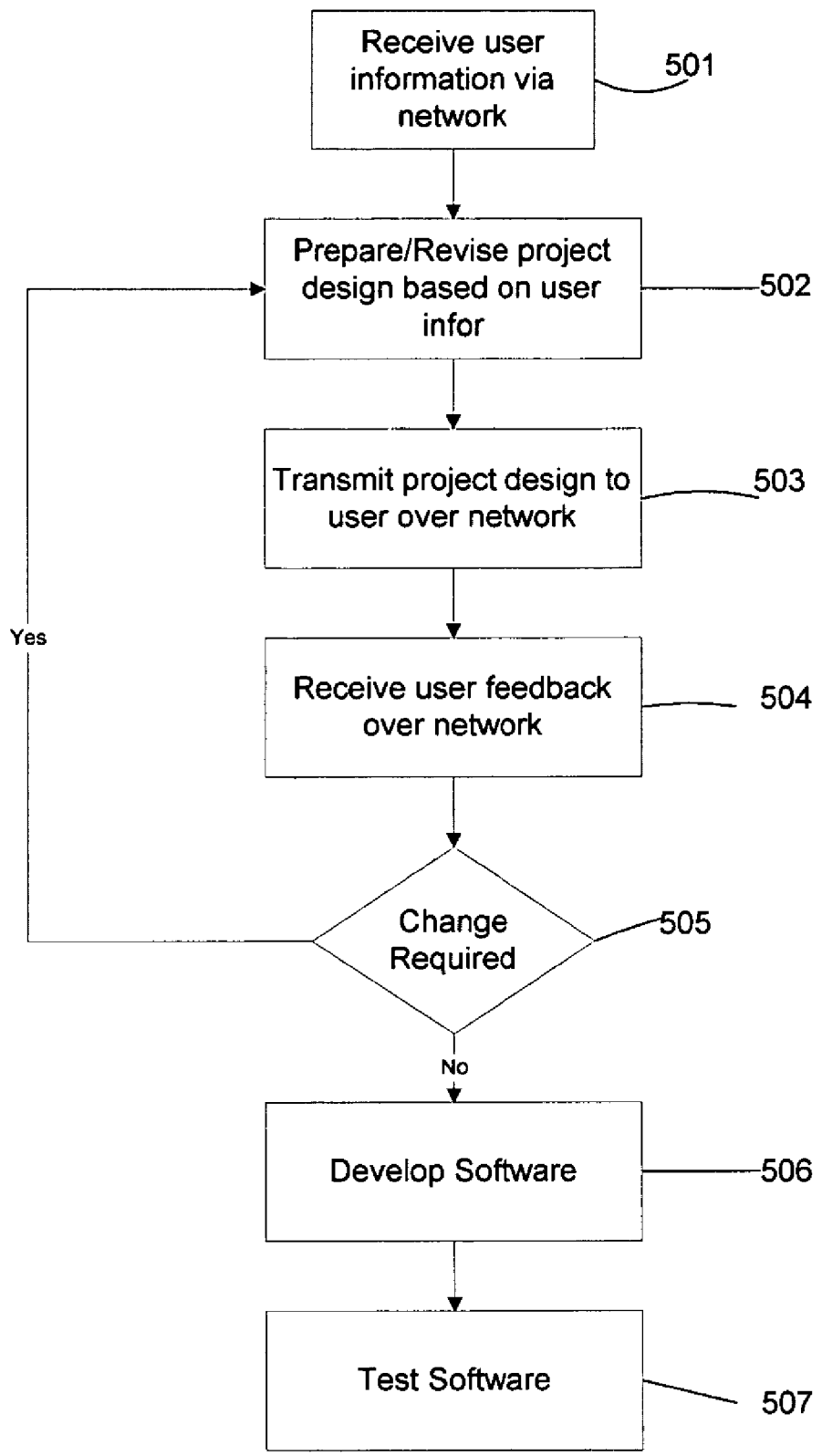
FIG. 5 is a flow diagram illustrating one embodiment of a method of developing software in a software integration method.

FIG. 5 is a flow diagram illustrating one embodiment of a method of developing software in a software integration method. At processing block 501, user information is received by a software development module 215 via a network, such as the Internet 101. At processing block 502, a project design is prepared or revised based on the received user information. At processing block 503, the project design is transmitted by the software development module 215 to a user 133, 134, 143, 144 over the network 101. At processing block 504, user feedback is received over the network 101. At processing block 505, the software development module 215 determines whether change is required or requested by the user feedback. If change is required or requested, the software development module returns to processing block 502 to revise the project design based on the received user feedback. If change is not required or requested by the user feedback, the software development module 215 proceeds to processing block 506 where it develops software based on the project design. At processing block 507, the developed software applications are tested in the testing module 216.

User information is received at processing block 501 by the software development module. The user information may be directed to the software development module 215 by the integrator 211. User information may be information that is submitted by a user on a user system 133, 134, 143, 144 via the Internet 101 and include information regarding type of software system desired, specifications, information specific to the user, etc.

At processing block 502, software development module 215 prepares or revises a project design based on the user information. The project design will be used by the software development 215 to develop software meeting user specifications. At processing block 503, the project design prepared at processing block 502 is transmitted to the user 133, 134, 143, 144 over a network such as, for example, the Internet 101. By transmitting the project design over the Internet instead of faxing or communicating with a user over the telephone, processing time for developing a final project design is greatly reduced, and cycle time is reduced and productivity is increased for the software integration because all relevant information will be constantly and readily available via the Internet by all participants in the software configuration, installation and verification process.

At processing block 504, software development module 215 receives user feedback over the network 101. The user feedback may include approval for a project design or changes required or requested by the user. At processing block 505, the system development module determines whether changes are required by the user feedback. If change is required by the user feedback, the software development module 215 returns to processing block 502 to revise the project design.

If changes are not required at processing block 505, the software development module 215 will proceed to develop the software described in the project design at processing block 506. For a power management control system, the software developed may include PMCS applications and HMI applications. At processing block 507, the applications developed at processing block 506 may be tested by testing module 216, whose execution may be repeated to isolate and eliminate bugs, bottlenecks or otherwise tune installation performance.

Figure 6:
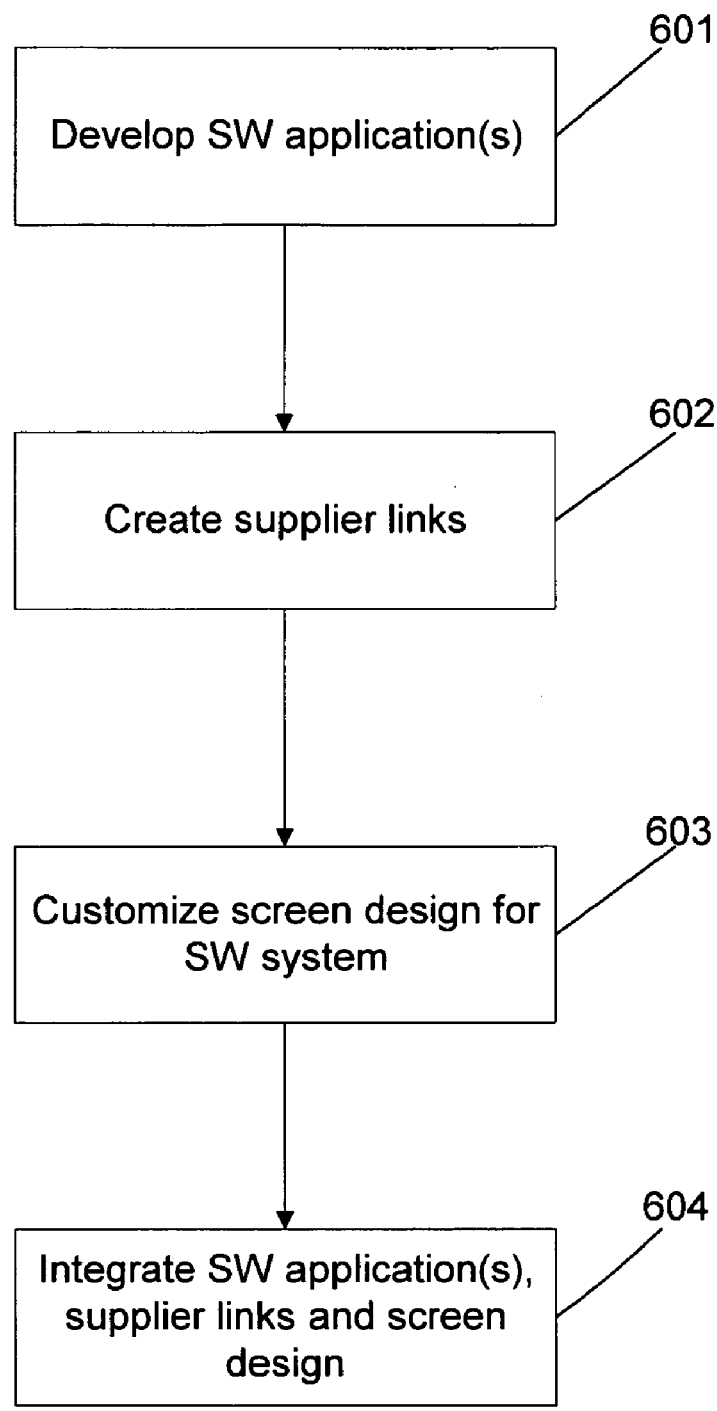
FIG. 6 is a flow diagram illustrating one embodiment of a method of creating an integrated application in a software integration method.

FIG. 6 is a flow diagram illustrating one embodiment of a method of creating an integrated application in a software integration method. At processing block 601, software applications are developed for a software system. At processing block 602, supplier links are created to relevant suppliers in a distribution system. At processing block 603, a screen design is customized for the software system. At processing block 604, the developed software applications, the supplier links and the screen design are integrated into an integrated application.

At processing block 601, software applications are developed as described above with reference to FIG. 5. At processing block 602, supplier links are created and graphical representations of the links are provided. The supplier links provide connection capability to relevant suppliers having network connection such as, for example, suppliers who are Internet ready. The relevant suppliers are part of a distribution system, and the supplier links enable a user to monitor and operate the distribution system.

At processing blocks 603, screen design is customized for the software system requested by the user 133, 134, 143, 144. Customization of the screen design will be described in more detail with reference to FIG. 7 below.

At processing block 604, the developed software application, the supplier links and the customized screen design are integrated into an integrated application. The integrated application may then be transferred to the user's computer system 133, 134, 143, 144 from the software development site 110.

Figure 7:
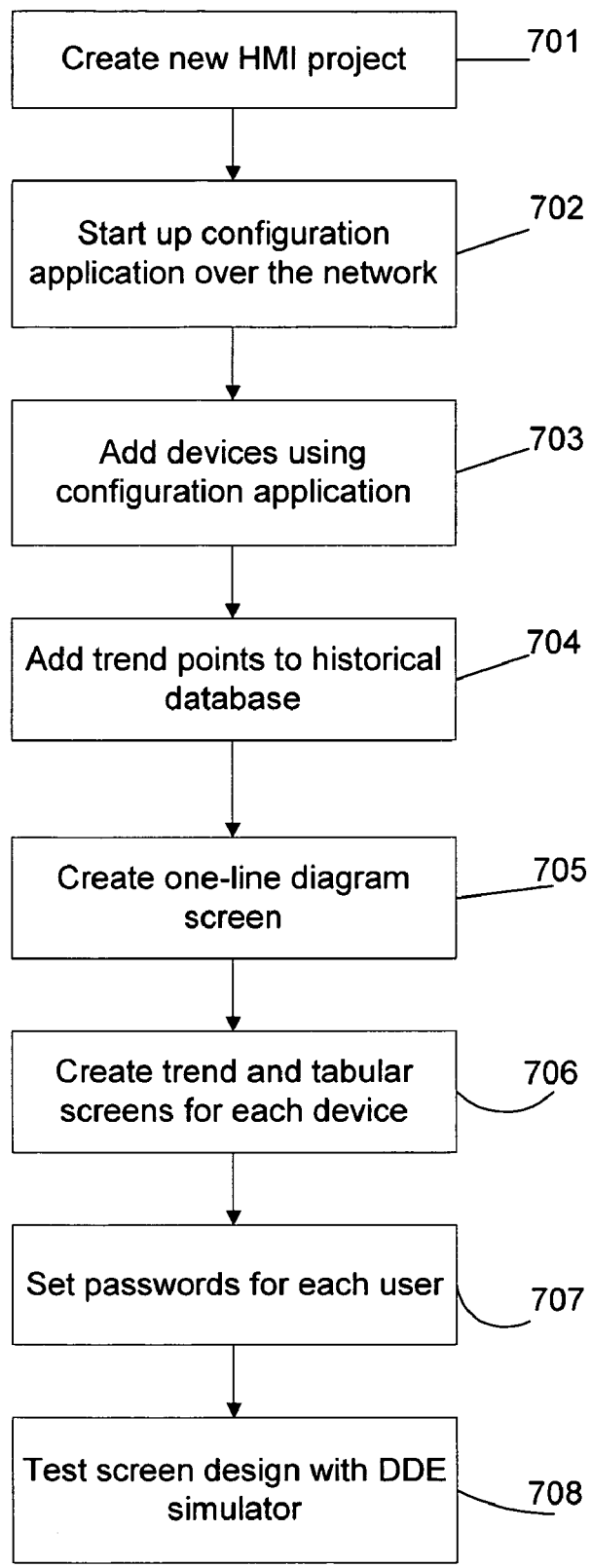
FIG. 7 is a flow diagram illustrating one embodiment of a method of customizing a screen design in a software integration method.

FIG. 7 is a flow diagram illustrating a method of customizing a screen design in a software integration method in an embodiment related to automated configuration of power system components. At processing block 701, a new HMI project is created in screen design module 217. At processing block 702, a configuration application is started up over the network 101. At processing block 703, devices are added using the configuration application. At processing block 704, trend points may be added to historical database. At processing block 705, one-line diagram screens are created. At processing block 706, trend and tabular screens are created for each device. At processing block 707, passwords are set for each user. At processing block 708, the screen design may be tested using a dynamic data exchange ("DDE").

At processing block 701, a new HMI project is created at screen design module 217. The new HMI project created may be a new Cimplicity™ project. At processing block 702, a configuration application is started up by the screen design module 217 over the Internet 101. At processing block 703, devices are added using the configuration application. At processing block 704, trend points are added to the historical database. At processing block 705, one-line diagram screens are created.

At processing block 706, trend and tabular screens are created for each device. At processing block 707, passwords are set for each user. At processing block 708, the screen design may be tested using a DDE simulator to ensure functionality.

Figure 8:
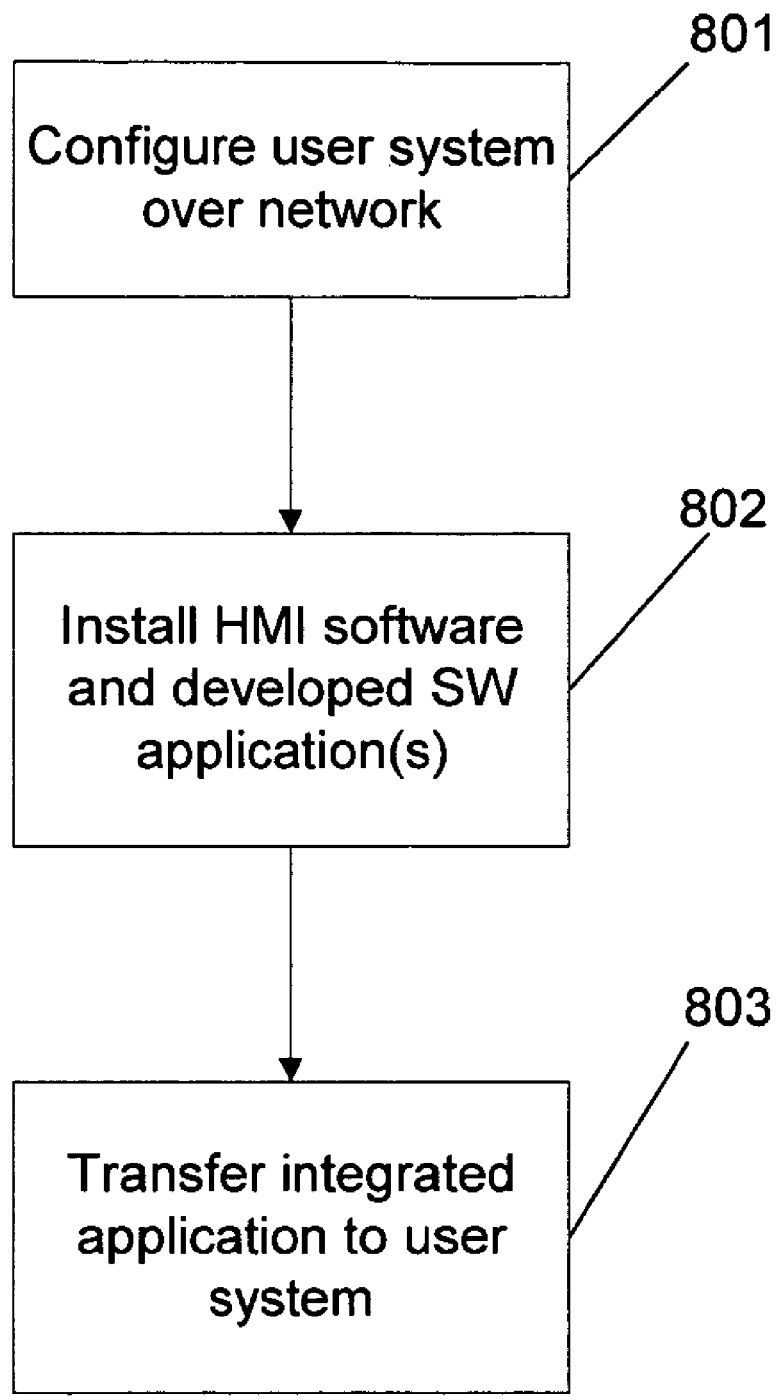
FIG. 8 is a flow diagram illustrating one embodiment of a method of integrating a system in a software integration method.

FIG. 8 is a flow diagram illustrating one embodiment of a method of integrating a system in a software integration method. At processing block 801, a user system is configured over a network such as, for example, the Internet 101. At processing block 802, HMI software is installed and software applications are developed. At processing block 803, an integrated application is transferred from a development computer system to the customer's computer system.

At processing block 801, a user's computer system 133, 134, 143, 144 is configured over a network, for example, the Internet 101. At processing block 802, HMI software is installed and software applications are developed for the software system requested by the user. The software developed at processing block 802 may include PMCS software. At processing block 803, an integrated application, for example, the integrated application described with reference to FIG. 6 above, is transferred from a development system to a user's system. The user's system may include a PC, a mainframe, a network, or any other type of computer system compatible with PMCS software.

An integration system has been described which replaces faxes and phone calls for communication between integrators 211 and other relevant people such as, for example, sales engineers and engineering services. By routing communication between integrators 211 and others through a network such as, for example, the Internet 101, cycle time is dramatically reduced and productivity is increased because all relevant information is constantly and readily available via the Internet. By creating web-based application wizards such as, for example, a configuration application, some of the manual work performed by integrators is eliminated. For example, all relevant project information does not need to be compiled by an integrator and entered into a project spreadsheet to aid in development. By using Internet 101 applications, all relevant information is instead automatically available to the integrator 211.

Thus, the integration process takes full advantage of available Internet technology, enabling improved customer satisfaction. Also, by creating an Internet-based integration process, 24-hour project execution is provided. Thus, a user is not limited to ordering software systems and having software systems integrated during "business hours", and global resources may be leveraged by the software development site 110. For example, integrators 211 may be based at various global locations such as India or Mexico. The Internet-based integration process also reduces integration costs and cycle time, by enabling web-based communication instead of communication through facsimile or telephone.

By enabling web-based integration process, support may also be provided for the software integrated over the Internet by support module 213. By using a web-based process, software integrators and software support personnel may be based in various geographic locations, and each software integrator or support staff member may troubleshoot various and multiple sites.

While the foregoing description includes details and specificities, it is to be understood that these have been included for purposes of explanation only, and are not to be interpreted as limitations of the present invention. Modifications to the embodiments described above can be made without departing from the spirit and scope of the invention, as is intended to be encompassed by the following claims and their legal equivalents.

What is claimed is:

1. A system for integrating a software system over a network, comprising:
    means for receiving an order for a software system from a user using a user system at a server over the network;
    means for configuring the user system over the network; and
    means for installing the software system on the user system over the network; and
    wherein the software system comprises a power management control system; and
further comprising:
    means for developing at least one software application for the software system;
    means for customizing a screen design for the software system over the network;
    means for integrating the at least one software application and the screen design for the application to produce an integrated software system;
    means for creating supplier links for ordering material over the network; and
    means for integrating the at least one software application, the supplier and the seen design for the application to produce an integrated software system; and
    wherein the means for customizing a screen design comprises;
        means for creating human machine interface project;
        means for starting up a configuration application over the network;
        means for using the configuration application to add devices;
        means for adding trend points to a historical database;
        means for creating a one line diagram screen;
        means for creating trend and tabular screens for each device;
        means for setting passwords for each user; and
        means for testing the screen design with a dynamic data exchange simulator to ensure functionality.

2. The system of claim 1, wherein the network comprises the Internet.

3. The system of claim 1, further comprising:
    means for transmitting the order for a software system to a development facility; and
    means for receiving at least one software application for the software system from the development facility.

4. The system of claim 1, further comprising means for testing the at least one software application.

5. The system of claim 1, further comprising means for developing at least one software application for the software system wherein the developing means comprises:
    means for receiving user information over the network;
    means for preparing a project design for the software application based on the user information;
    means for transmitting the project design to the user over the network,
    means for receiving user feedback over the network; and
    means for revising the project design until the user feedback does not contain change requests.

6. The system of claim 1, wherein the means for installing the software system on a user system over the network comprises:
    means for installing human machine interface software and the at least one software application onto the user system over the network; and
    means for transferring the integrated application from a development system to the user system over the network.

7. The system of claim 1, further including means for starting up operation of the software system over the network, wherein the means for starting up operation of the software system over the network comprises means for configuring user devices over the network to support the software system and means for testing the software system on the user system.

8. The system of claim 1, further comprising:
    means for supporting the software system on the user system over the network after start up.

9. The system of claim 1, further comprising means for starting up operation of the software system over the network.

10. The system of claim 1, wherein the user system comprises at least one of a personal computer and a mainframe.

11. The system of claim 1, wherein the user system comprises a network.

* * * * *